(12) United States Patent
Murphy et al.

(10) Patent No.: US 6,308,326 B1
(45) Date of Patent: Oct. 23, 2001

(54) RUN-TIME MODULES FOR DYNAMICALLY ADJUSTING COMPUTER OPERATION

(75) Inventors: Colm J. Murphy, Blarney Co. Cork (IE); James Kateley, San Jose, CA (US); Byron Han, Honolulu, HI (US); Ken Fitzgerald-Smith, Co. Cork (IE)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/227,411

(22) Filed: Jan. 8, 1999

(51) Int. Cl.[7] ........................................ G06F 9/45
(52) U.S. Cl. ............................................... 717/11
(58) Field of Search ................................. 717/11

(56) References Cited

U.S. PATENT DOCUMENTS

| | | | |
|---|---|---|---|
| 5,303,379 | * | 4/1994 | Khoyi et al. ............................ 717/11 |
| 5,706,510 | * | 1/1998 | Burgoon ................................. 707/203 |
| 5,742,284 | * | 4/1998 | Duggan et al. ....................... 345/335 |
| 5,970,252 | * | 10/1999 | Burton et al. .......................... 717/11 |
| 6,167,567 | * | 12/2000 | Chiles et al. ............................ 717/11 |

OTHER PUBLICATIONS

Pirolli, P., Computational Models of Information Scent–Following in a Very Large Browsable Text Collection, 1997, ACM, p. 1–16.*
Cohen et al., QuickSet: Multimodal Interaction for Distributed Applications, 1997, ACM, p. 1–14.*
Bacon et al. Using Events to Build Distributed Applications, 1995, IEEE, p. 148–155.*

* cited by examiner

*Primary Examiner*—Mark R. Powell
*Assistant Examiner*—John Q. Chavis
(74) *Attorney, Agent, or Firm*—Burns Doane Swecker & Mathis, L.L.P.

(57) ABSTRACT

Code module interfaces are provided which allow a user to adjust the functionality of a program at run-time. The code module interfaces (CMIs) can be selectively activated by a user at run-time. Then, the control software will call the CMIs at various instances, for example, at startup, after each state change in the control software, at idle time and when the control software has completed all of its tasks. Alternatively, when each CMI is loaded, it can specify at which state change(s) that CMI is to be called to increase speed of operation.

16 Claims, 3 Drawing Sheets

FIG. 1

Boot Drive

RUN-TIME MODULES FOR DYNAMICALLY ADJUSTING COMPUTER OPERATION

BACKGROUND OF THE INVENTION

The present invention is generally directed to the control of computers, such as personal computers, from remote sources, and more particularly to code module interfaces which enable a user to adjust the control functionality at run-time.

In one exemplary application, the present invention can be employed in the process of installing software onto a computer. There are a number of different ways in which software can be installed. For example, the software can be copied from diskettes that are inserted into the computer, or it can be downloaded from another source, such as an external disk drive, to which the computer is connected. In these approaches, the typical installation process involves booting the computer from the diskette or other source, and then having the computer install the software itself on an internal storage device, such as a hard disk drive.

While this approach to the installation of software is straightforward, it is limited by virtue of the fact that it is relatively slow. In particular, each computer is required to boot and launch its own installation application. In addition, the speed of transfer is dictated by the speed of the computer itself. In a manufacturing environment of the type where operating system software is installed on each newly manufactured computer, a slow software installation process can present a significant bottleneck in the overall manufacturing process.

It is desirable, therefore, to provide an approach which permits software to be installed on a computer at a faster rate. To this end, it is preferable to use a host controller, i.e., a higher speed computer, to control the software downloading process. In order that this approach to installing software be carried out most efficiently, the computer onto which the software is being installed should be in a passive state, insofar as initiating commands for the downloading of the software is concerned. In this regard, therefore, it is desirable to provide a mechanism which permits the computer to behave as if it is an external storage device under the control of the host controller.

Accordingly, in a related disclosure (U.S. patent application Ser. No. 08/383,863 entitled "Device Driver For Controlling A Computer From An External Source" and filed on Feb. 6, 1995) a system for downloading software to remote computers is described. This system provides a downloading engine which can be run by a plurality of different users to download software. However, different users may have different requirements for the way in which software is downloaded to remote computers at this installation. For example, at one site, a process engineer may want to run a virus check prior to downloading software. At another site, the user may prefer a different type of interface than the standard interface supplied with the software that controls downloading from the host controller. At still a third site, the user may want to download both operating system software and bundled application software.

Thus, these end users tend to adjust the functionality of the downloading engine provided to them by the developer. Various techniques are known for adjusting the functionality of existing software. For example, so-called "patches" are frequently distributed to fix bugs in existing software. When run, a patch actually modifies the software code so that the change in functionality implemented by the patch is permanent in the sense that the new functionality is present every time that the software is run. Thus, patches have the drawback that the user is unable to selectively implement functionality changes, e.g., to selectively adjust the routine for downloading software to computers.

In the foregoing example relating to the downloaded engine, each user that desires different functionality for the downloading engine will typically create his or her own patch. As a result, the downloading engine itself will effectively mutate, i.e., each user may have a different version of the downloading engine. This creates additional problems including, for example, difficulty in upgrading existing software, parallel development wherein one or more users may be trying to add the same needed functionality to the downloading engine, and impairing the developer's ability to replicate problems experienced by users.

Accordingly, it would be desirable to have techniques and mechanisms for allowing the functionality of software, e.g., control software for downloading from a host controller to one or more remote computers, to be adjusted at run-time to provide users with complete flexibility in the control software's functionality while also allowing the control software developer to maintain control over the software code.

SUMMARY

In accordance with the present invention, code module interfaces are provided which allow a user to adjust the functionality of a program which operates as a state machine at run-time. According to exemplary embodiments of the present invention, the code module interfaces (CMIs) can be selectively activated by a user at run-time. Then, the control software will call the CMIs at various instances, for example, at startup, after each state change in the control software, at idle time and when the control software has completed all of its tasks. Alternatively, when each CMI is loaded, it can specify at the state change(s) at which it is to be called to increase speed of operation.

A powerful feature of CMIs according to the present invention is their ability to change the operating state of the control software itself. That is, the CMI may be called at a point when the control software is about to transition from a first state to a second state. However, when finished running, the CMI may instead direct re-entry to the control software at some third state.

According to yet another feature of the present invention, the capability to create CMIs may be provided to the end-user of the controlled software. In this way, the end-user may create CMIs which adapt the downloading engine to his or her own specific needs. However, the end-user's creation of, and implementation of, a particular CMI will not alter the characteristics or code of the downloading engine itself. Thus, from the control software developer's point of view, CMIs according to the present invention allow end-users to adapt functionality to fit their own needs, but without raising problems related to version control, parallel development or problem replication.

Further features of the invention, and the advantages offered thereby, are explained in detail hereinafter with reference to exemplary embodiments illustrated in the accompanying drawings.

DETAILED DESCRIPTION

To facilitate an understanding of the principles which underlie the present invention, it is described hereinafter with respect to its application in specific situations. For example, the invention is particularly suitable for use in the manufacture of new computers, where operating system software is installed on disk drives in the computers before delivery to the customer. It will be appreciated, however, that this is not the only practical application of the invention. Rather, it will find utility in any situation in which it is desirable to adjust the functionality of software at run-time.

Figure 1:
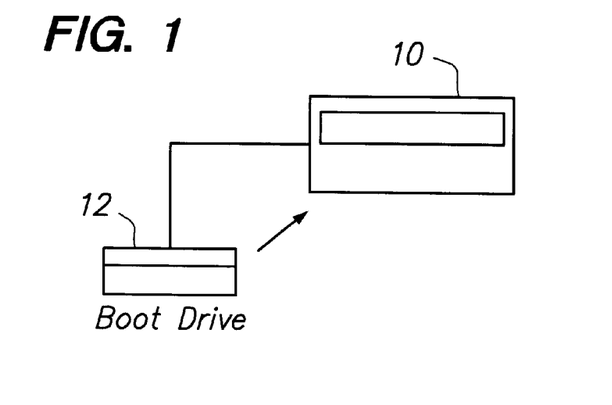
FIG. 1 is a schematic diagram of one system for installing software onto a computer.

To provide a thorough understanding of the concepts which underlie the present invention, a brief description will first be made of various approaches to the downloading of one or more bundles of software onto a computer. Referring to FIG. 1, in one approach, a computer 10 onto which the software is to be installed performs all of the downloading actions itself. In this approach, an external boot drive 12 is connected to the computer 10 via a bus cable, for example one which complies with the Small Computer System Interface (SCSI) specification. The external boot drive 12 includes a disk which contains the necessary system software for starting up, or booting, the computer 10, and an application program for copying files, such as operating system files, to the computer 10. As will be described below, this software may include one or more code module interfaces (CMIs) that are selectively activated at run-time. The boot drive 12 may also contain the bundle of software that is to be loaded onto the computer 10, or this software might be stored on a network or other disk drive (not shown) that is connected to the computer 10.

Figure 2:
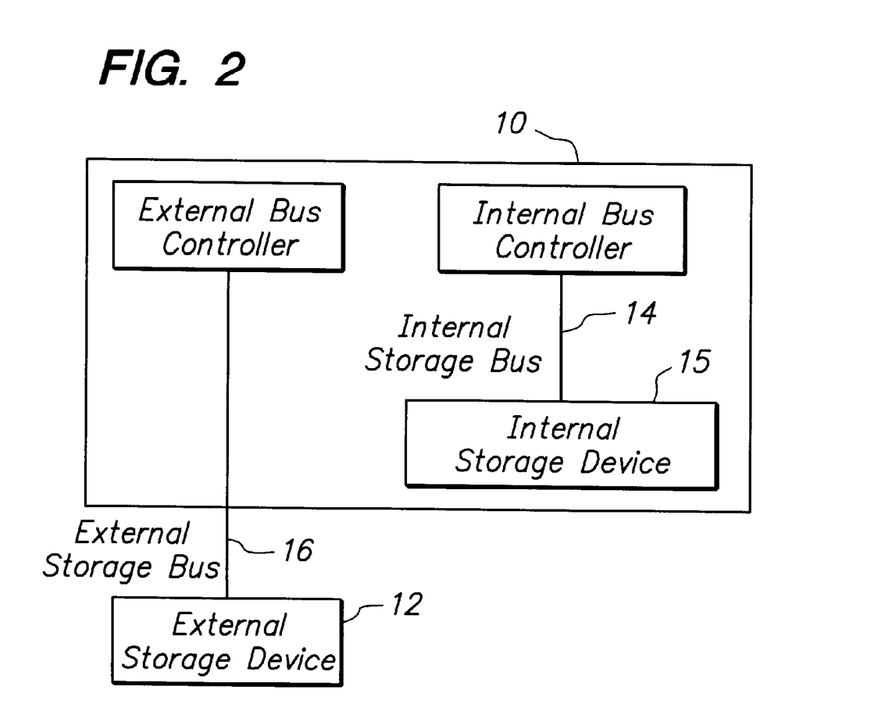
FIG. 2 is a block diagram of the bus architecture for the system of FIG. 1.

FIG. 2 is a block diagram of the bus architecture for the arrangement shown in FIG. 1. The computer 10 has two storage device bus interfaces. One bus is used for one or more internal storage devices 15, typically hard disk drives. The second bus 16 is used to connect the computer to external storage devices, such as hard disk drives, CD-ROM drives, and the like. In normal operation, the computer acts as the initiator, sending out commands to control the external bus and reading from or writing to the external devices, which function as targets for the commands.

In the operation of the arrangement illustrated in FIGS. 1 and 2, upon being powered up the computer 10 boots from the external boot drive 12, and launches a file transfer application. This application causes the computer 10 to locate the bundle of software that is needed, for example from the boot drive 12, and copy this bundle, in its entirety, onto its own internal disk drive 15. After all of the files have been copied, the computer 10 can checksum the copied bundle, to verify its integrity, and perform a shutdown operation. One of the main advantages of this approach is that it is simple and can be easily incorporated into other software, such as testing software that is used at the manufacturing site.

While this type of action is relatively straightforward, it has certain inherent limitations. First, it is relatively slow, since each computer has to boot and launch its own file transfer application. Also, the speed of transfer is dictated by the speed of the computer 10, so that the download time for a given bundle may vary considerably from one type of computer to another.

Figure 3:
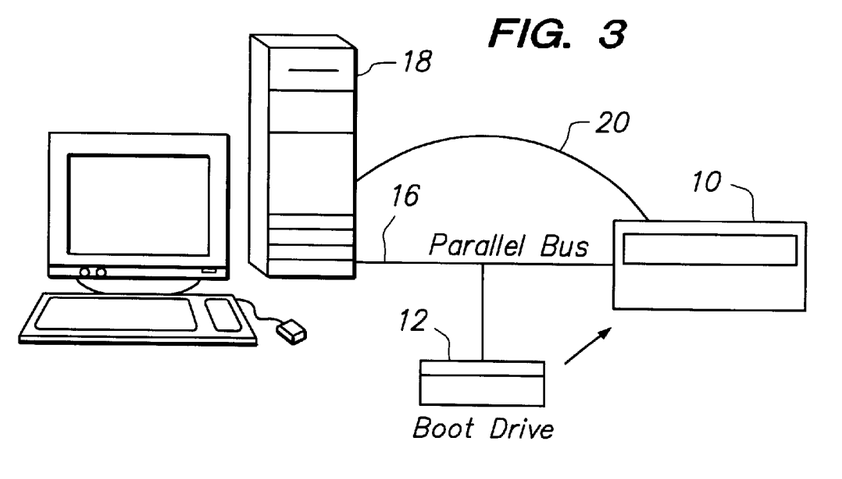
FIG. 3 is a schematic diagram of another system for installing software onto a computer.

FIG. 3 illustrates a different setup for downloading software, which addresses the limitations associated with the arrangement of FIGS. 1 and 2. In the embodiment of FIG. 3, the computer 10 is connected to a host controller 18 as well as the external boot drive 12. The controller 18 can be a relatively high speed computer which might be part of a network, for example. The computer 10 is connected to the controller 18 by means of the external bus 16, which is also connected to the boot drive 12. Preferably, the computer 10 is also connected to the controller 18 by a serial cable 20, to facilitate communications between these two devices.

Figure 4:
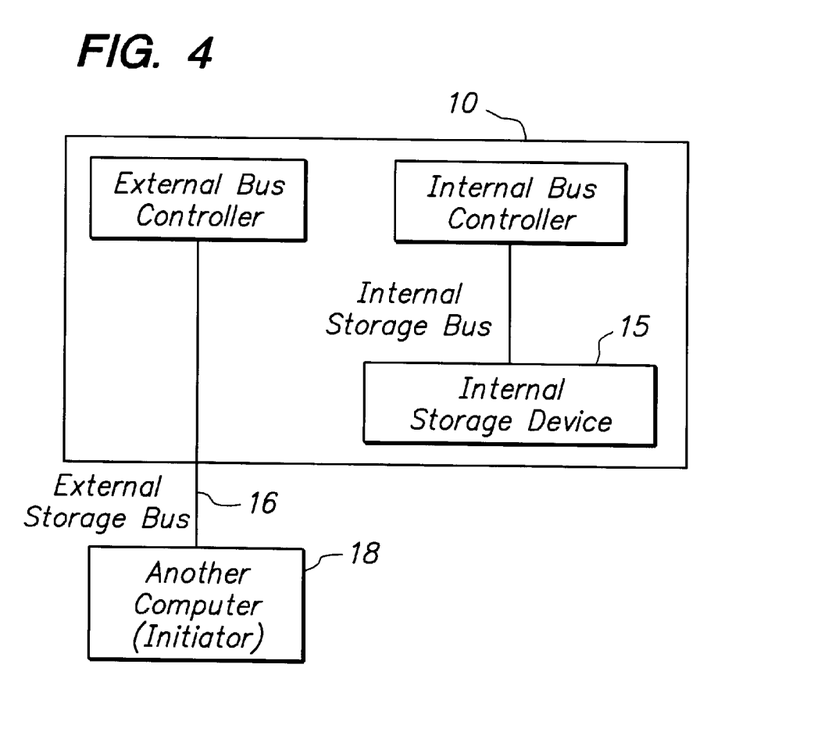
FIG. 4 is a block diagram of the bus architecture for the system of FIG. 3.

In this arrangement, the computer 10 no longer functions as the initiator of commands. Rather, it is the target of commands generated by the host controller 18. The architecture for this arrangement is illustrated in FIG. 4. The commands are generated by another computer, i.e., the controller 18, as the initiator, and sent to the computer 10 as the target. The target computer 10 accepts these commands and responds as appropriate. For example, a read command from the controller 18 is accepted by the computer 10, which decodes it and translates it into a read command that is sent to its internal storage device. The data read back from the internal storage device is translated into the format needed for the external bus 16, and sent back to the initiating controller 18. Regardless of the type, format or size of the internal storage device, therefore, the initiating computer 18 identifies it as an external storage device having the characteristics of the external bus. Thus, for example, the bus 16 might be a SCSI bus, whereas the internal storage device 15 could be a device which has different formatting specifications, such as an IDE disk drive or a PCMCIA card. The controller 18 need not be aware of this fact, and only needs to communicate with the internal storage device as though it is a SCSI device.

In the operation of this arrangement for the installation of software on the computer 10, after being connected as shown in FIG. 3, the computer 10 is powered up and begins to boot itself from the boot drive 12. As part of a normal boot process, the computer 10 loads and executes device driver software stored on each external device connected to it. For example, the device driver stored on an external device such as the boot drive 12 can tell the computer 10 how to communicate with the drive, and install the relevant software into the computer's main memory. Alternatively, the device driver for the external boot drive 12 can be modified as described in the above-identified related application to include additional software which allows the computer to correctly decode the incoming commands and requests that arrive over the external storage bus 16.

At some point during or after the installation of this driver, the computer 10 informs the controller 18 that it has successfully started. After receiving this communication, the controller downloads the required software bundle onto the internal disk drive of the computer 10. This downloading process can be adaptively adjusted at run-time by activating one or more CMIs, as will be described below. In carrying out this operation, the controller 18 treats the computer 10 as a normal external disk drive, sending read and write commands to it. During this time, the computer 10 does not run the typical routines associated with a normal operating system, such as updating timer functions, responding to keystrokes, controlling a display, or the like. Rather, the computer primarily functions to carry out those operations necessary to respond to commands from the controller 18 and transfer the downloaded data from the external bus 16 to its internal bus 14 connected to the target drive 15.

Of course, the computer need not be limited to only those activities associated with transferring data from an external source to its internal drive. If desired, the driver can include other functionality responsive to externally received commands as well. For example, if the external bus 16 operates at a slower speed than the internal bus 14, the driver can include routines which enable the computer to store data received from the external bus in a cache memory, and then transmit data over the internal bus 14 at a faster rate. During the time that the data is being cached, the computer can send other commands over the bus 14, such as configuration parameters, requests for information, and the like.

Having provided a brief contextual overview of an environment in which the present invention can be applied, attention turns now to the control software used to control the processes performed by external boot drive 12 or host controller 18. In these exemplary embodiments, the control software operates to download data (e.g., bundled software) to a remote device (e.g., a computer), however those skilled in the art will appreciate that the present invention is in fact applicable to any software. This exemplary control software can be separated into different entities for the purposes of the following discussion: the downloading engine and one or more code module interfaces.

Figure 5:
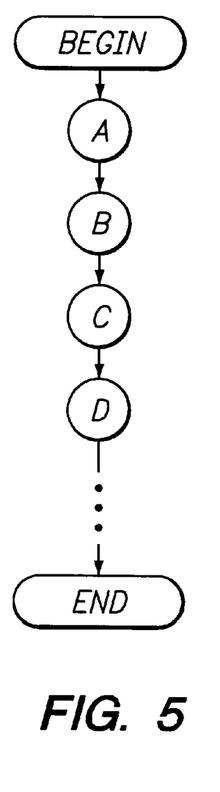
FIG. 5 illustrates operation of a sequential state machine.

The downloading engine can be conceptualized as a finite state machine. Typically, each state in a state machine has one or more exit criteria which must be met in order for the state machine to transition to another state. For example, as seen in FIG. 5, the state machine may move in sequence from State A to State B to State C to State D upon completion of the exit criteria associated with each state, and so on, until it completes the last state. In this example, each state is associated with one or more tasks involved in the downloading process described above. For example, the downloading engine might have the following states:

| State | Description |
|---|---|
| flReset ' | |
| //initialise enviromment | |
| flMountTarget ' | |
| //Mount Target Drive... | |
| flInitiateSWPNScan ' | |
| //Initiate a Software Partno Scan | |
| flContinueSWPNScan ' | |
| //Software Partno Scan Continuator | |
| flFinishSWPScan ' | |
| //Software Partno is now known | |
| flBundleSchedule ' | |
| //Schedule a background task | |
| flBundleContinuator ' | |
| //wait for background proc to complete | |
| flStateGetBundle ' | |
| //find the appropriate bundle | |
| flInitiateWipScan ' | |
| //Initiate a Wip Label scan | |
| flContinueWipScan ' | |
| //Wip Scan Continuator' | |
| flMetaSWPNScan' | //Confirms target still present after scan |
| flFinishWipScan ' | |
| //Wip code is now known | |
| flInitiateUpilScan ' | |
| //Initiate Upil Scan | |
| flContinueUpilScan ' | |
| //APSN/UPIL Scan Continuator | |
| flFinishUpilScan ' | |
| //Upil now known | |
| flmountvolume ' | |
| //Mount the Target Volume | |
| flChecksumVolume ' | |
| //Blockchecksum volume | |
| flBundleload ' | |
| //Folder Load either the UUT drive or the Image Drive | |
| flLocalCleanup ' | //Finish for standalone (uut) mode |
| flTosMountVolume ' | //Tos Mount Image Volume Remotely |
| flTosCopy ' | //Tos copy command |
| flTosCopystatus ' | //Tos copy status |
| flTosChecksum ' | //Tos Checksum Volume |
| flTosChecksumstatus ' | |
| //Tos Checksum status | |
| flTosBandDrive ' | //Tos Maximise Allocation Block count |
| flTosUnmountVolume ' | //Tos Unmount Volume (Target only) |
| flTosSpindown ' | //Tos Spindown must occur before drive unmount |
| flTosUnmountDrive ' | //Tos Unmount Drives (Target & Image) |
| flHostCheck ' | // Vax confirm check & setup |
| flHostconfirmInitiator ' | // Vax confirm initiator |
| flhostconfirmcontinuator ' | // Vax confirm continuator |

-continued

| State | | Description |
|---|---|---|
| flFinish | → | //General Cleanup... |
| flDelayDisconnect | ' | //Delay while error is being displayed... |
| flWaitDisconnect | ' | //wait for UUT to disconnect |

The present invention provides a variation on the state machine concept illustrated in FIG. 5. After each task associated with a state is completed as governed by each state's associated exit criteria, the downloading engine will move to the next sequential state except as otherwise dictated by an active CMI.

Thus, CMIs provide a technique for adjusting the exit criteria of states in a state machine (as well as providing the capability to add new states) on a selectable, run-time basis. Exemplary interactions between the state machine and CMIs will now be described. Active CMI(s) can be called each time that the downloading engine transitions from one state to another. Alternatively, each code module interface may specify the particular state(s) for which it will be called. This allows the control software designer to utilize different architectures: i.e., one single code resource that is called at multiple state changes or several separate code resources each called at different state changes.

Figure 6:
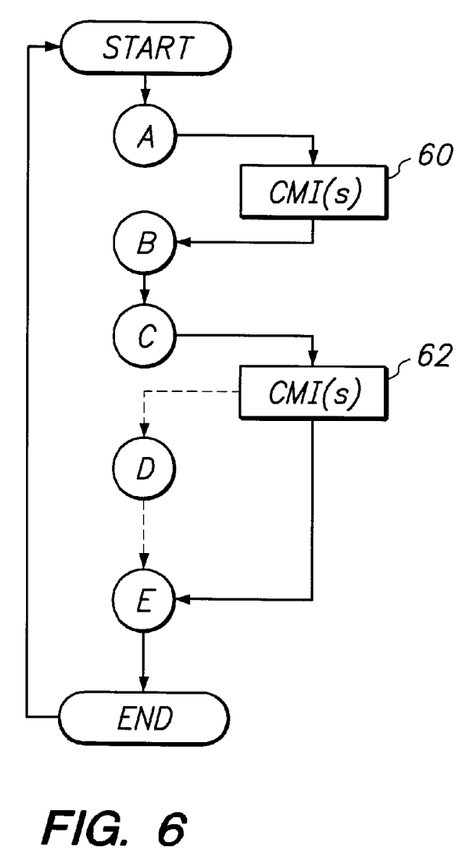
FIG. 6 illustrates an exemplary operation of a sequential state machine which is modified to include active CMIs according to the present invention.

For example, FIG. 6 depicts an exemplary iteration performed by a state machine according to the present invention in which two different CMIs 60 and 62 are active. When loaded, these CMIs provided state masks which indicated the particular state transitions during which they were to be called. Specifically, the state mask for CMI 60 identifies state A and the state mash for CMI 62 identifies state C. Thus, CMI 60 is called as the state machine exits state A. In the iteration shown in FIG. 6, after CMI 60 is finished, it returns control of the process to the state machine at state B. After the tasks associated with state C are completed, CMI 62 is called. Unlike CMI 60, however, the processes performed by CMI 62 in this iteration do not return control to the state which would otherwise be next in the sequence absent interaction with CMI 62, i.e., state D. Instead, CMI 62 returns control to the state machine at state E. Of course if the parameters evaluated by CMI 62 change during a subsequent iteration of the process, CMI 62 might instead return control at state D, as indicated by the dotted line arrow. Then the process would continue under the "normal" control of the state machine through state D to state E.

To fully understand how active CMIs can interact with the above-described exemplary states of the downloading engine, consider the following exemplary application of CMIs provided in the context of the afore-described downloading engine. Suppose that a user has launched the downloading engine. As a first step, the downloading engine will identify the CMIs which are available by searching appropriate directories or libraries. For example, at a system site (e.g., a manufacturing plant) the information systems department may have created one or more CMIs tailored to adjust the functionality of the downloading engine to customize its operation. Exemplary code for creating CMIs is discussed below. The user may then have the option of activating one or more identified CMIs, e.g., by selection of menu item(s). Alternatively, the user may first drag and drop iconic representations of desired CMI(s) into a folder, which CMI(s) the downloading engine will register during initialization.

For this example, suppose that the downloading engine identifies, and the user activates, a CMI which modifies the default functionality of the downloading engine so that a virus scan is performed on the storage device associated with the host controller 18 (or on the external drive 12) prior to downloading software. In this way, infected software will not be promulgated amongst the various remote computers being serviced by the system. By making this selection at run time, rather than providing this function via a patch, the user can weigh the benefits of performing the virus scan versus the additional time for performing the download(s) for each particular production run. Thus where, for example, many downloads need to be performed as quickly as possible, and the likelihood of viral infection is sufficiently low, the user might opt not to activate this CMI at run-time.

When activated, this user-selected CMI will register with the downloading engine by, for example, providing resource path information and global variable information to the downloading engine. Additionally, the CMI may provide a state mask to the downloading engine which identifies those state transitions for which the CMI is to be called (or alternatively, those state transitions for which the CMI is not to be called). For example, the selected virus-related CMI might have a state mask which instructs the downloading engine to only call this CMI for the transition between the "flChecksum Volume" state and the "flbundle load" state in the list above, i.e., before the downloading engine starts to copy software to the remote computer(s). As another example, checksum verification can be performed at a particular state as defined by the state mask, wherein one or more local checksums are compared with a master checksum. For CMIs which only affect the control software's functionality at a few state transitions, the state mask avoids unnecessary calls as compared with a default scenario (e.g., no state mask provided by the CMI at registration) wherein the download engine will call the CMI for all state transitions.

As mentioned above, the CMI may change the next state to which the download engine will transition after the CMI runs. For example, if the virus scan CMI described in the previous example does not detect a virus resident in the storage area containing the software to be downloaded, then the CMI may not change the return state and the download engine would proceed normally in sequence through its states when control is passed back to the download engine at the state immediately preceding invocation of the virus scan CMI. Otherwise, if a virus is detected, the CMI could, for example, return control to the download engine at the "flFinish" state and abort the download procedure.

Moreover, one active CMI can call another active CMI. Consider the following example. Suppose that a system site has developed a first CMI for its downloading engine to provide auditing capabilities that check the integrity of the downloaded software, which capabilities are not provided in the state machine shipped by the developer. This first CMI uses checksum error checking to evaluate the software downloaded on 10% of the machines receiving banded software. If the CMI detects a downloading failure then it calls a second CMI which performs a more rigorous audit of the downloaded software, e.g., by evaluating the downloaded software on 100% of the machines for the next 625 iterations.

As mentioned above, one beneficial aspect of code module interfaces according to the present invention is the capability for end-users to create CMIs to adjust the functionality of the developed software themselves, but without altering the code of the developed software itself. To this end, a standardized technique for creating a CMI should be provided which gives the end-user the framework within which to create a CMI that will adjust the functionality without re-writing the underlying state machine software, e.g., the downloading engine. Accordingly, Applicants provide the following general example of a standardized CMI shell.

```
//___________________________________________________
// Sample Code Module Entry Point
    [++Must be first Routine]
// Stage indicates what this call is, Refcon is for internal module use only
//___________________________________________________
short main(int Stage,void *Refcon,...
{
......... initializing code etc ....
switch(Stage)   //   Determine action
{
case    _Startup:
            Add code here......
        break;
case    _Idle:
            Add code here (example provided below).....
        break;
case    _Task:
            Add code here (example provided below).....
        break;
case    _Finish:
```

-continued

```
            Add code here (example provided below).....
        break;
}
return iocode;
}
```

Each of these sections in the exemplary CMI shell will now be described in more detail. In the foregoing code, it will be recognized by those skilled in the art that, when active, the CMI is called for each state with a different set of parameters. This type of functionality is supported by, for example, use of the variable argument (vararg) option provided in the "C" programming language. The main entry-point in the exemplary CMI shell outlined above is defined as:

short main(int Stage,void *Refcon, . . . The ", . . ." at the end of the function definition in the foregoing example indicates the use of a variable argument list. These variable arguments can be defined differently by the downloading engine for each state transition at which the CMI is called.

When first loaded (i.e., at registration) a startup call (i.e., case_Startup in the shell outlined above) is performed. The following arguments can be passed to the CMI from the downloading engine:

```
c (int Stage,              // always_Startup.
    void *Refcon,          // Pointer to own storage space, initialized by first
                           // resource in the module file.
ModuleRecptr TaskRecptr,   // TaskRecord for this module
Ptr Dispatcher)            // Pointer needed for callback calls. save if needed.
```

An example of the code which could be used for the startup case is as follows:

```
case_Startup:
    Taskptr              = (ModuleRecptr) va_arg(ap, long);
                         // Pull The Task Record
    if (!Taskptr) break; // Abort fast!
    Taskptr- >StateMask  = OXFFFFFFFE;//Set state mask to call always
    Taskptr- >Options    = OX0000;
    Dispatcher           = (Ptr) va_arg(ap, long);
                         // Pull The Dispatcher address break;
```

The idle case relates to situations wherein the software is performing other tasks while it is waiting for a condition to be satisfied to exit a particular state. For example, an idle loop can be provided so that background tasks, e.g, screen updating, can be performed while the main program is awaiting some input or condition to be satisfied. The following is an example of the arguments passed and the type of code that could be provided in the case_Idle portion of the shell outlined above.

```
Arguments passed:
    (int Stage,          // always_idle.
    void *Refcon)        // Pointer to own storage space, initialized by first resource in
                         // the module file.
``` case_Idle:
    if (random(1_out_of_1000)) make_that_irritation_noise; break;

Just before the downloading engine exits its last state, the finish routine of this exemplary CMI is called to perform "housekeeping" activities, e.g., cleaning up memory, returning a graphical user interface to its pre-CMI state, etc. An example of the arguments which could be passed and the code associated with case_Finish is as follows.

case_Finish:
    DisposeHdl(Taskptr->Refcon);
    Taskptr->Refcon=nil;
    // Kill external reference break;

As described above in the startup call, this particular CMI is designed to run at each state transition. Thus, each time the downloading engine changes states the main routine is called with the_Task parameter. The following exemplifies arguments that might be passed and code associated with the case_Task of the exemplary CMI shell described above.

```
Arguments passed:
    (int Stage,          // always_Finish.
    void *Refcon)        // Pointer to own storage space, initialized by first resource in
                         // the module file.
```

```
Arguments passed:
    (int Stage,                      // always_Task.
    void *Refcon,                    // Pointer to own storage space, initialized by first resource in
                                     // the module file.
    int state,                       // state that is being left
    int *nextstate,                  // pointer to next state, can be changed
    UUTRecPtr up);                   // pointer to the UUTRec of current UUT.
typedef struct
{
    short           flState;            //   state of this UUT
    Boolean         flLinkOnline;       //   Serial Link is Online
    Boolean         flTargetMounted;    //   Target Hard Drive in Online!
    Boolean         flBundleOnImageDisk; //  Is our bundle safely on an image disk?
                                        //   (Pluto only.)//use filmageptr==nil
    Boolean         flHostResponse;     //   Flag indicates Host response received
    RawData         ScanData;           //   Scan parser returned information
    Str3 I          BundlePartno;       //   Bundle Partno scanned or otherwise deposited
    here
    Str3i           Wipcode;            //   Wipcode scanned or otherwise deposited bere
    Str3 I          Upilcode;           //   Upil/Apsn scanned or otherwise deposited here
    unsigned long   flRetrycount;       //   retry count
    unsigned long   flStartingTime;     //   time when we started
    unsigned long   fltimer;            //   General purpose Timer field
    OSErr           flErrCode;          //   last error occurring for this UUT
    short           flhostcode;         //   Host Response code from Vax
    long            flFolderloadRefCon; //   Some state info for Folderload
    bkRecType       *flBackProc;        //   Placeholder for Pluto Background Process...
    iDElemptr       flImageptr;         //   Target Harddrive information (uut I Image Drive)
    FSSpec          flSrcspec;          //   FSSpec of Source
    FSSpec          flDstspec;          //   FSSpec of Destintaion
    TosDeviceRecord flPlutoDrives[MaxTosDevices];// Tos Device Specifications
} UUTRec, *UUTRecPtr;
Example code:
int *nextstate;
short state;
UUTRecPtr up;
case        _Task:
    state       = va_arg(ap,int);
    nextstate   = (int *) va_arg(ap,long);
    up          = (UUTRecPtr) va-arg(ap,long);
    if (nextstate == flFinish) {
        if (up- >flErrCode == noerr)
```

```
        // if we are finished and we have no error
        PlaySoundFile(VictorySong_AJAX_File);
    else
        PlaySoundFile(Bad_bold_and_ugly_File);
}
```

From the foregoing, it can be seen that the present invention provides a number of advantages over conventional arrangements in which the functionality of software is adjusted by an end user by writing a patch. One advantage is that the underlying software is not modified. This allows the software developer to more readily troubleshoot the software. It also makes upgrading the software relatively uncomplicated. Another advantage is that it allows the end user to modify the functionality of the software "on-the-fly" in the sense that different modifications for different runs of the software.

The present invention can be implemented as software using any programming language, as will be readily apparent to those skilled in the art. The software can be run on any processor or computer and can be stored on any machine-readable medium, e.g., optically readable (CD), magnetically readable (diskette) or opto-magnetically readable.

It will be further appreciated by those skilled in the art that the present invention can be embodied in other specific forms without departing from the spirit or essential characteristics thereof. For example, the practical applications of the invention are not limited to the installation of software onto computers as part of a manufacturing process. Rather, the invention has utility in any situation in which it is desirable to flexibly adjust software functionality at run-time. The presently disclosed embodiments are therefore considered in all respects to be illustrative and not restrictive. The scope of the invention as indicated by the appended claims, rather than the foregoing description, and all changes that come within the meaning and range of equivalence thereof are intended to be embraced therein.

What is claimed is:

1. At least one storage medium, readable by a computer, having stored thereon a computer program including at least one code module interface (CMI) defined by a first set of software code and a state machine defined by a second set of software code having a plurality of states each state having at least one predetermined exit criterion, said program executable by the computer for causing the computer to perform the steps of:

registering said at least one CMI during an initialization state of said state machine;

determining, based on said step of registering, at least one state within said state machine upon exit of which said at least one CMI is to be executed;

executing said CMI when said computer exits said at least one determined state within said computer program; and re-entering said computer program at a state determined by said CMI, when said CMI executing step has ended, whereing functionality of said state machine is adjusted without altering said second set of software code.

2. The storage medium of claim 1, wherein said CMI determines said re-entry state independently of said state machine.

3. The storage medium of claim 1, wherein said step of registering further comprises the step of:

providing, by said CMI, a mask which identifies state transitions at which said CMI is to be called.

4. The storage medium of claim 1, further comprising the steps of:

executing said CMI at another of said at least one determined states in said state machine program; and providing a variable set of arguments associated with execution of said CMI, wherein said step of executing said CMI at said at least one determined state and said step of executing said CMI at said another of said at least one determined states are performed using different sets of arguments.

5. The storage medium of claim 1, further comprising the step of:

providing, as said CMI, a plurality of subsets of code within said first set of software code, each of which subsets are associated with a different state of said state machine.

6. The storage medium of claim 5, wherein said step of executing further comprises the step of:

running one of said subsets of said first set of software code that is associated with a state of said state machine indicated by said at least one step.

7. A storage medium, readable by a computer, having stored thereon a computer program including at least code module interface plug-in module executable by the computer for causing the computer to perform the steps of:

registering said at least one plug-in module;

determining, based on said step of registering, at least one step within said computer program wherein said at least one plug-in module is to be executed;

executing said plug-in module when said computer reaches said step within said computer program; and allowing said plug-in module to determine a re-entry step within said computer program for re-entering said computer program when said plug-in module executing step has ended.

8. The storage medium of claim 7, wherein said plug-in module determines said re-entry step independently of said computer program.

9. The storage medium of claim 7, wherein said step of registering further comprises the step of:

providing, by said CMI, a mask which identifies state transitions at which said plug-in module is to be called.

10. The storage medium of claim 7, further comprising the steps of:

executing said plug-in module at another step in said computer program; and providing a variable set of arguments associated with execution of said plug-in module, wherein said step of executing said plug-in module at said at least one step and said step of executing said plug-in module at said another step are performed using different sets of arguments.

11. The storage medium of claim 7, further comprising the step of:

provided, as said plug-in module, a plurality of sets of code, each of which are associated with a different state of said computer program.

12. The storage medium of claim 11, wherein said step of executing further comprises the step of:

running one of said sets of code that is associated with a state of said computer program indicated by said at least one step.

13. A method for adjusting the functionality of software code without altering the software code itself, said software code defining a plurality of states, each state having at least one predetermined exit criterion, said method comprising the steps of:

storing at least one code interface module (CMI) on a computer readable medium in a predetermined memory location;

launching said software code;

registering, by said software code, said CMI including identifying a state within said software code upon exit of which said CMI is to be run;

running said CMI after said at least one predetermined exit criterion associated with said identified state has been satisfied; and returning to a state within said software code determined by said CMI after said CMI has finished running.

14. The method of claim 13, wherein said functionality of said software code includes downloading software to a computer and said CMI operates to perform an audit on said downloaded software.

15. The method of claim 13, wherein said step of storing further comprises the step of:

providing a user interface for identifying selectable CMIs for run-time operation with said software code; and selecting, by a user said CMI from said identified selectable CMIs.

16. The method of claim 13, wherein said step of registering further comprises:

providing, by said CMI, a mask which identifies state transitions at which said CMI is to be called.

\* \* \* \* \*